US012628019B2

(12) United States Patent
Tomala et al.

(10) Patent No.: US 12,628,019 B2
(45) Date of Patent: May 12, 2026

(54) RETRIEVAL OF TRAINED ML MODEL FROM UE

(71) Applicant: NOKIA TECHNOLOGIES OY, Espoo (FI)

(72) Inventors: Malgorzata Tomala, Wroclaw (PL); Cinzia Sartori, Pullach (DE); Hakon Helmers, Sceaux (FR); Anna Pantelidou, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 530 days.

(21) Appl. No.: 18/040,389

(22) PCT Filed: Aug. 3, 2020

(86) PCT No.: PCT/EP2020/071757
§ 371 (c)(1),
(2) Date: Feb. 2, 2023

(87) PCT Pub. No.: WO2022/028664
PCT Pub. Date: Feb. 10, 2022

(65) Prior Publication Data
US 2023/0292168 A1 Sep. 14, 2023

(51) Int. Cl.
*H04W 24/10* (2009.01)
*G06N 20/00* (2019.01)
*H04W 76/27* (2018.01)

(52) U.S. Cl.
CPC ............ *H04W 24/10* (2013.01); *G06N 20/00* (2019.01); *H04W 76/27* (2018.02)

(58) Field of Classification Search
CPC ....... H04W 24/10; H04W 76/27; G06N 20/00
USPC .......................................... 455/418
See application file for complete search history.

(56) References Cited

U.S. PATENT DOCUMENTS

| | | | |
|---|---|---|---|
| 2019/0132708 A1 | 5/2019 | Belghoul et al. | |
| 2020/0169311 A1 | 5/2020 | Ottersten et al. | |

FOREIGN PATENT DOCUMENTS

| | | | | |
|---|---|---|---|---|
| WO | 2019/172813 A1 | 9/2019 | | |
| WO | 2020/017880 A1 | 1/2020 | | |
| WO | WO-2020122669 A1 * | 6/2020 | ............ | G06N 20/00 |
| WO | 2020/139181 A1 | 7/2020 | | |
| WO | 2021/219201 A1 | 11/2021 | | |
| WO | 2022/008037 A1 | 1/2022 | | |
| WO | 2022/028665 A1 | 2/2022 | | |

OTHER PUBLICATIONS

"New WID on Study on traffic characteristics and performance requirements for AI/ML model transfer in 5GS", 3GPP TSG-SA WG1 Meeting #88, S1-193606, OPPO, Agenda Item: 5, Nov. 18-22, 2019, 3 pages.

(Continued)

*Primary Examiner* — Jirapon Tulop
(74) *Attorney, Agent, or Firm* — Carter, DeLuca & Farrell LLP

(57) ABSTRACT

It is provided an apparatus comprising: one or more processors, and memory storing instructions that, when executed by the one or more processors, cause the apparatus to: monitor if a trained model is available at a terminal; inform a network that the trained model is available at the terminal if the trained model is available at the terminal.

4 Claims, 5 Drawing Sheets

(56)                    References Cited

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", 3GPP TS 37.320 V15.0.0, Jun. 2018, pp. 1-27.
"3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.
Shalev-Shwartz et al., "Understanding Machine Learning: From Theory to Algorithms", Cambridge University Press, Jul. 2014, 16 pages.
International Search Report and Written Opinion received for corresponding Patent Cooperation Treaty Application No. PCT/EP2020/071757, dated Apr. 16, 2021, 18 pages.

"KI #2, New Sol, Federated Learning among Multiple NWDAF Instances", 3GPP TSG-WG SA2 Meeting #139E e-meeting, S2-2004029, China Mobile, Agenda Item: 8.1, Jun. 1-12, 2020, 4 pages.
Office Action received for corresponding Chinese Patent Application No. 202080104337.0, dated Aug. 26, 2024, 9 pages of Office Action and no page of translation available.
"New WID on Study on traffic characteristics and performance requirements for AI/ML model transfer in 5GS (from S1-193606)", 3GPP TSG SA Meeting #86, SP-191040, SA WG1, Agenda Item: 6.6, Dec. 10-13, 2019, 3 pages.
"Key Issue for trained data model sharing between multiple NWDAF instances", SA WG2 Meeting #136AH, S2-2001226, Huawei, Agenda Item: 8.2, Jan. 13-17, 2020, pp. 1-2.
"KI #2, New Sol: support flexible data collection model for multiple NWDAFs", SA WG2 Meeting #139E, S2-2003782, Samsung, Agenda Item: 8.1, Jun. 1-12, 2020, pp. 1-5.
Notice of Allowance received for corresponding Chinese Patent Application No. 202080104337.0, dated Jan. 3, 2025, 4 pages of Notice of Allowance and no page of translation avaialable.
Office Action received for corresponding European Patent Application No. 20751511.5, dated May 6, 2025, 11 pages.

* cited by examiner

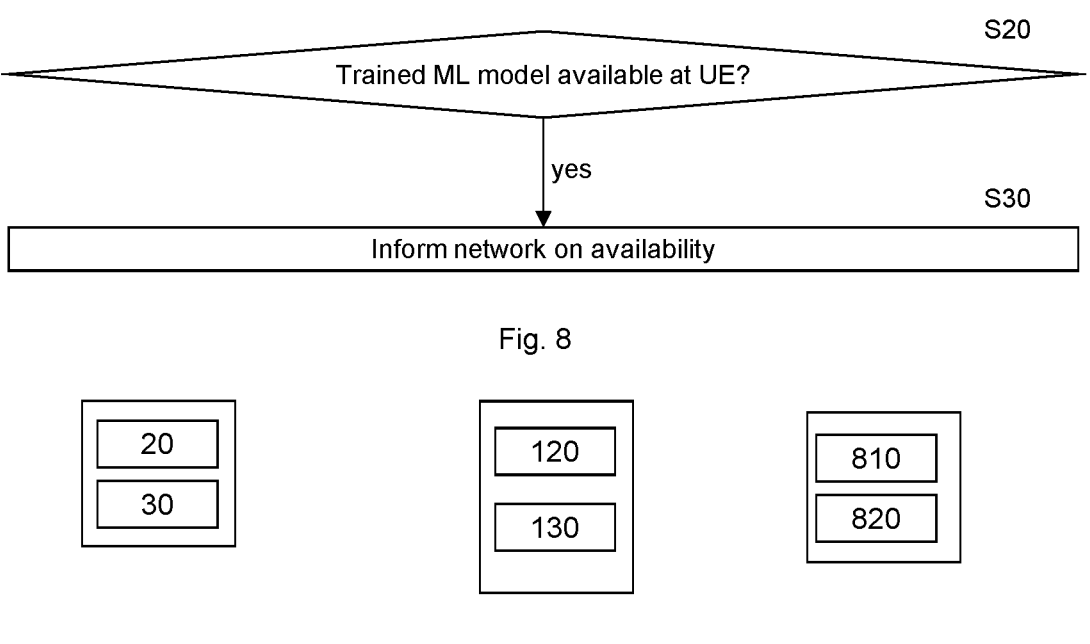
S20
Trained ML model available at UE?
yes
S30
Inform network on availability
Fig. 8
| 20 |
| 30 |
Fig. 7
| 120 |
| 130 |
Fig. 9
| 810 |
| 820 |
Fig. 11
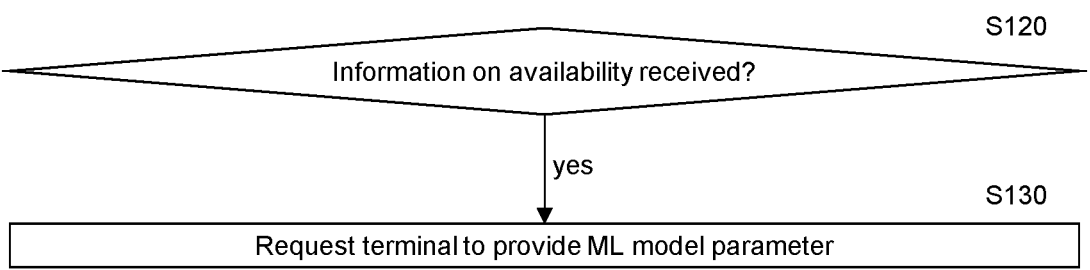
S120
Information on availability received?
yes
S130
Request terminal to provide ML model parameter
Fig. 10

RETRIEVAL OF TRAINED ML MODEL FROM UE

CROSS-REFERENCE TO RELATED APPLICATIONS

This application is a national phase entry of International Application No. PCT/EP2020/071757, filed Aug. 3, 2020, the contents of which are hereby incorporated by reference in their entirety.

FIELD OF THE INVENTION

The present disclosure relates to retrieval of one or more trained ML models from UE.

ABBREVIATIONS

3GPP 3$^{rd}$ Generation Partnership Project
3G/4G/5G 3$^{rd}$/4$^{th}$/5th Generation
AI Artificial Intelligence
AMF Access and Mobility Management Function
CN Core Network
gNB 5G base station
IE Information Element
LTE Long-Term Evolution
MDT Minimization of Drive Tests
ML Machine Learning
MR-DC Multi RAT— Dual Connectivity
MTC Machine-Type Communication
NF Network Function
NG-RAN Next Generation RAN
NR New Radio
O&M Operation & Maintenance
RAN Radio Access Network
RAT Radio Access Technology
Rel Release
RRC Radio Resource Control
RRM Radio Resource Management
SA System Architecture
SON Self-Optimizing Networks
SRB Signaling Radio Bearer
TS Technical Specification
UE User Equipment
UL Uplink

BACKGROUND OF THE INVENTION 5G networks are expected to meet the challenges of joint optimizations of an ever-increasing number of performance measures. In addition, 5G brings a complicated system design and optimization issues introduced by NR architecture/features including MR-DC, beamforming, etc., which render traditional human-machine interaction slow, error-prone, expensive, and cumbersome to handle these challenges.

5G evolution drives the need to study use cases and to propose potential service requirements for 5G system support of Artificial Intelligence (AI)/Machine Learning (ML). The agreed 3GPP SA1 Study Item in S1-193606 describes targeted objectives and emphasizes that ML and AI will engage concrete 5G network entities and infrastructure. The way of developing machine learning processes and models already assumes that the 5G traffic and end-user's device will take part in ML model training.

The book by Shai Shalev-Shwartz and Shai Ben-David, "Understanding Machine Learning: From Theory to Algorithms", Cambridge University Press, 2014, describes ML as follows: "As an interdisciplinary field, machine learning shares common threads with the mathematical fields of statistics, information theory, game theory, and optimization. It is naturally a subfield of computer science, as our goal is to program machines so that they will learn. In a sense, machine learning can be viewed as a branch of AI (Artificial Intelligence), since, after all, the ability to turn experience into expertise or to detect meaningful patterns in complex sensory data is a cornerstone of human (and animal) intelligence.". Also, in this book, Machine Learning (ML) is defined as part of automated learning through which computers are programmed so that they can "learn" from input available to them. Learning is defined to be the process of converting experience into expertise or knowledge. The input to a learning algorithm is training data, representing experience, and the output is some expertise, which usually takes the form of another computer program that can perform some task.

ML execution in 5G may require the end user to train an ML model (i.e. UE learns from the provided data in a training process).

Meanwhile, 3GPP RAN discusses use cases that may be enabled via AI. They include energy saving, traffic steering, mobility optimization, load balancing, physical layer configuration optimization, etc.

3GPP Rel-16 defined 5G features under RAN-centric Data Collection mechanisms that addressed a number of network optimization related use cases. Under the Rel.16 RAN Data Collection umbrella, 5G standard supports SON and MDT reports [3GPP TS 37.320], providing the means for the operators to monitor and optimise performance of any kind of 5G deployments and related issues. MDT reports, by default, can be categorized per optimization use case (e.g. for radio coverage, the UE logs radio signal levels with positioning data; for mobility robustness, the UE records radio signal levels when radio link failure is detected, etc). Overall, MDT and SON enable data collection for both user performance and network performance.

Training of ML models requires big amounts of data. Thus, SON/MDT feature constitutes an efficient method for collecting UE data. SON/MDT records of measurements, taken by an end user, are very good candidates for monitoring the predictions of mobile traffic/users with the use of ML models. A UE may have several trained ML models locally available. ML models training may be performed per use case or optimization problem.

MDT is an existing framework allowing radio measurements retrieval. The data collection in Rel.16 for 5G inherits (from LTE) two types of MDT: Immediate MDT methods to deliver real-time measurements (Immediate MDT when e.g. results of measurements performed for typical RRM operations in RRC CONNECTED), and Logged MDT methods to deliver in non-real time, measurements results taken during the time the UE context is released or suspended at the network (Logged MDT when the UE is in RRC IDLE or INACTIVE state). Immediate MDT reporting means that the UE generates real time report of radio measurements immediately after performing them. For Logged MDT reporting, the UE is configured when it is in connected mode. The UE collects data when it is (enters) in RRC IDLE or RRC INACTIVE mode. Deferred reports in a form of logs are sent to the network when the UE (re-)enters the connected mode; the UE can indicate measurement availability to the network through an RRC message and the network can obtain the logged reports through the UE Information procedure. 3GPP TS37.320 and TS38.331 define the procedures.

By using the method described in PCT/EP2020/061734 'MDT configuration for ML training at UE, the network instructs the UE to train the ML model autonomously.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: monitor if a trained model is available at a terminal; inform a network that the trained model is available at the terminal if the trained model is available at the terminal.

According to a second aspect of the invention, there is provided an apparatus comprising: one or more processors, and memory storing instructions that, when executed by the one or more processors, cause the apparatus to: monitor if an information is received that a trained model is available at a terminal; request the terminal to provide the trained model if the information is received.

According to a third aspect of the invention, there is provided a method comprising: monitoring if a trained model is available at a terminal; informing a network that the trained model is available at the terminal if the trained model is available at the terminal.

According to a fourth aspect of the invention, there is provided a method comprising: monitoring if an information is received that a trained model is available at a terminal; requesting the terminal to provide the trained model if the information is received.

Each of the methods of the third and fourth aspects may be a method of machine learning.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:

network may fetch the trained ML model from UE;

network may receive information that allows deciding on time for fetching the trained ML model and/or on priority of fetching the trained ML model.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 7 shows an apparatus according to an example embodiment of the invention;

FIG. 8 shows a method according to an example embodiment of the invention;

FIG. 9 shows an apparatus according to an example embodiment of the invention;

FIG. 10 shows a method according to an example embodiment of the invention; and FIG. 11 shows an apparatus according to an example embodiment of the invention.

DETAILED DESCRIPTION OF CERTAIN EMBODIMENTS

Figure 1:
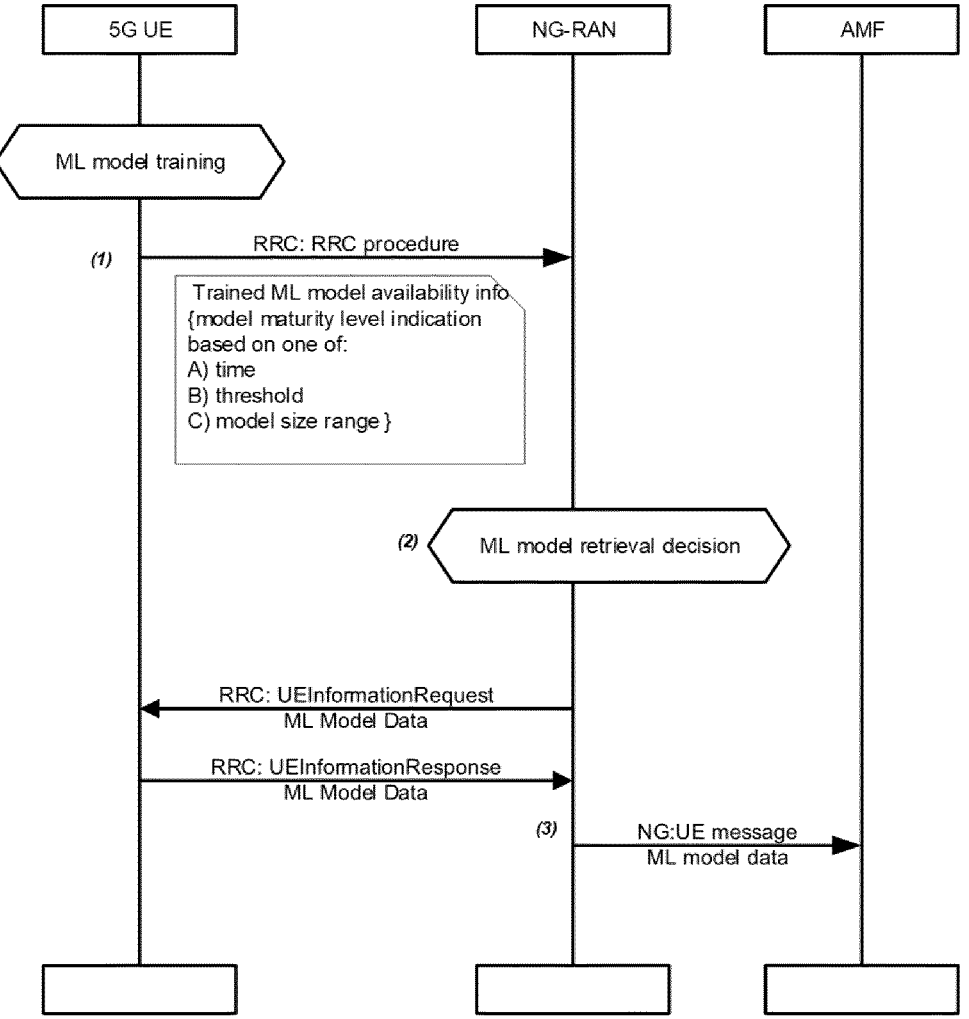
FIG. 1 shows a high-level message flow in a stand-alone 5G architecture according to some example embodiments of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Even though most of the AI algorithms may be implementation specific, the trigger for retrieving an ML trained model at the UE as well as the ML execution targets should preferably be standardized. Thus, the signalling support for ML training and execution between the user and the network will likely adapt some of the existing frameworks, which makes standardized signalling for ML support feasible, and a main target from standard perspective.

In order to accomplish that an ML model trained in the UE is available to a 3GPP compliant architecture (RAN, CN), the 5G RAN network nodes may support signaling capabilities that will facilitate the transfer of the trained ML model (i.e., its parameters).

Currently, there is no signaling framework in the standards to:

know that the UE has participated in the ML Training, especially after it had transitioned to RRC IDLE and the network has released the UE context;

fetch the trained ML model (its parameters);

Control and prioritize the model data retrieval without jeopardizing regular radio operations While there might be different methods to involve the UE in ML execution and trigger ML model training, it is recommendable to define standard interfaces for the signaling of retrieving the ML model trained in the UE. 5G system support of Artificial Intelligence (AI)/Machine Learning (ML) for model distribution and transfer (download, upload, update, etc.) does not exist yet. When the ML model is trained in the UE, some example embodiments of the invention signal the configuration and/or the status of the ML model procedure to the network. MDT may be used as a signaling baseline to be extended for ML purposes.

Some example embodiments of the invention address a case of an ML model being trained in the UE that should be retrieved for execution in the network. They comprise Control Plane signalling and procedures for retrieving, by the network, the ML model trained in the UE. Some example embodiments provide new 'ML specific' parameters used to determine ML model characteristics in procedures related to ML model training or setting conditions when to retrieve ML model. These parameters can be used as conditions that determine further signalling of RRC parameter(s) or indicators enabling the network to decide the best way to retrieve the trained ML model.

The retrieval may be split into three main portions:

1. The retrieval initiation, triggered by ML specific behavior and actions in the UE, by:

ML model availability occurrence. The UE determines it has an ML model available (trained) and makes the information available to RRC layer. The UE may determine if the ML model is sufficiently trained based on one or more parameters related to the training. In detail, it may compare an actual value of such parameter with a target value of the parameter. The network may provide the target value to the UE, or the target value may be predefined. Examples of such parameters are ML model maturity level and ML model status, as explained further below. The network (gNB) may either determine (calculate) a target value on its own, or it may receive the target value directly or indirectly from an entity (e.g. a server) that hosts the configuration of the ML model. An example of such an entity is O&M center that may either determine the target value or may forward a target value from another entity hosts the configuration of the ML model to the gNB.

ML model availability indication to the network (represented by gNB). The availability may be attributed with an ML model maturity level and/or an ML model status. The UE may signal the ML model availability to the gNB and may provide parameters, such as ML model maturity level and/or an ML model status to the gNB.

2. The gNB acts in response, accordingly:

gNB requests the ML model retrieval, tailored by the one or more ML model parameters if the UE provides the ML model parameters. The request can be immediate or postponed. In addition, it may have normal priority or it may be down-prioritized.

3. gNB distributes the ML model onwards to other network entities. This step involves the distribution of the ML model over network interfaces within RAN Nodes and onwards (e.g. to the CN, as shown in FIG. 1). This step may be omitted if the trained ML model is used only in the gNB itself.

A basic overview of the three steps is shown in FIG. 1, where the ML model data are sent to the Core Network (AMF), as an example of another network function using the ML model data. Namely, the UE performs training of the ML model. If the model is trained to a certain extent, the UE informs NG-RAN thereof by an RRC procedure. This information may comprise, in addition to the information on availability of the trained ML model, one or more parameters related to the training of the ML model. One such parameter is the maturity level, which is described at greater detail further below. Note that the message flows shown in the figures depict only the messages relevant for some example embodiments of the invention and omit messages that may be needed in preparation or in follow-up of the relevant message.

Based on the availability indication including the parameters, if any, RAN decides to retrieve the ML model data. Therefore, it sends a respective UEInformationRequest to UE. UE responds with the ML model data. RAN may forward the ML model data to other network functions (e.g. AMF) or to other RAN nodes.

Hereinafter, some example embodiments are described at greater detail. As a precondition, it is assumed that the UE has been involved in ML model training and that the ML model exists in the UE.

Each ML model (and its training) is applicable to one or more RRC states (RRC_IDLE, RRC_INACTIVE or RRC_CONNECTED) in the UE. This implies that the UE that was selected and was instructed to train the ML model and/or executes the ML model in the at least one RRC state. For example, if the ML model is targeted to the RRC state RRC_IDLE, the UE learns radio measurements, or any other measurements selected for ML training performed in RRC_IDLE state. If the ML model target RRC state is RRC_CONNECTED, the UE learns radio measurements performed in this RRC_CONNECTED state.

If the UE performs training in RRC CONNECTED state, the UE may enable the data retrieval by the network while being in the same state (i.e., in RRC CONNECTED before releasing the RRC connection). When the UE trains an ML model in an RRC state that has no active RRC connection to the network (i.e., RRC_IDLE, RRC_INACTIVE), the ML model data cannot be transmitted to the network in the same RRC state. Thus, for the ML model data retrieval, UE has to perform an RRC state transition. This implies that the UE, if selected and instructed for training and/or executing an ML model in RRC IDLE and RRC INACTIVE state, maintains the ML model data in RRC states during which network has no RRC connection to the UE. It keeps the ML model data at least until RRC connection occurs (i.e., the UE enters RRC CONNECTED). In RRC_CONNECTED state, UE may transmit the RRC model data to the network.

Detailed implementations of the three main portions outlined hereinabove according to some example embodiments are explained:

1. The ML model retrieval initiation by the UE: This process comprises two steps, namely:
   a) The UE detects that the ML model is available (trained). The UE determines that it has a trained ML model available and makes the RRC layer aware of the availability. The UE may use one or more of the parameters related to training to assess if the ML model is sufficiently trained.
   b) The UE signals the ML model availability to the gNB The ML model availability determination may be a simple Boolean function (true/false). In some example embodiments, the UE may additionally determine the actual values of one or more parameters of the availability and inform the gNB about these parameter values via corresponding RRC information elements. gNB may take the one or more parameter values into account when deciding whether or not to retrieve the ML model data from the UE. The UE may even decide, based on these one or more parameter values of the ML model, not to inform the network on the availability. Due to these one or more parameters used to determine ML model availability, too frequent and inefficient signaling overhead may be avoided.

Below we describe in further detail example parameters that can be used by the UE to determine the existence of a sufficiently trained ML model, namely the ML model maturity level and the ML model status parameters.

ML model maturity level: ML model maturity level is a parameter that defines how mature the ML model is in terms of the training process based on at least one of Time: The UE decides how mature the ML model is by determining how long the ML model was trained, or how much time elapsed since the ML model was uploaded to the UE. The actual value and a target value of the parameter of the ML model define the assessment condition for the UE, i.e. how the UE should determine ML model maturity with regard to time. It may have values like "short", "medium", or "long" or it may indicate explicitly the time elapsed since beginning of the training or since the ML model was uploaded to the UE. If the ML model is assessed by the UE positively, according to the target value of the parameter (e.g. running ML model took long time), the UE sets the RRC parameter accordingly to signal an actual value of the ML model maturity level parameter.

Threshold: The UE decides how mature the ML model is by determining how much the trained data deviate from the original ML model or if convergence is reached within a certain threshold of confidence in the trained ML model. Alternatively, the threshold may comprise a classification decision threshold that would mean that the Trained ML Model decides to perform an action when the classification threshold is exceeded and a different action when it is not exceeded. The threshold may further be used by the UE to compare the results if the results are above the certain predefined threshold. This, for example, may concern the case when the UE was tasked to record radio signal strength measurements if a measurement exceeds a predefined radio level (given in dB) threshold. The signaled parameter value may be Boolean (below or above the predefined threshold).

Model Size: The UE decides how mature the ML model is by determining the size of data used for the training. In such a case, the bigger the size of the ML model is, the more mature the ML model is considered to be. Model size may be calculated after the ML model has been trained long enough, e.g., some time has elapsed or certain behavior on model convergence is observed. The parameter may have values like "small", "medium", and "large". Additionally, model size could depend on the actual size in megabytes needed to describe a trained ML model in terms of the total number of layers, type of layers, output shape of each layer, number of weights per layer, etc.

ML model status: The ML model status is another parameter that indicates the status of the training of the model. Example values of the ML model status may be:

Ongoing (the UE is continuing the process of ML Training)

Inactive (the UE has temporality no active ML Training, e.g. no conditions met)

Trained (the UE has completed the process of ML Training)

The signaling of such parameter values to the network, e.g. the ML model maturity level and ML model status, allows the UE, in addition to initiating the retrieval procedure, to pass additional information that will help the gNB to make an appropriate decision on the retrieval of the ML model.

Figure 2:
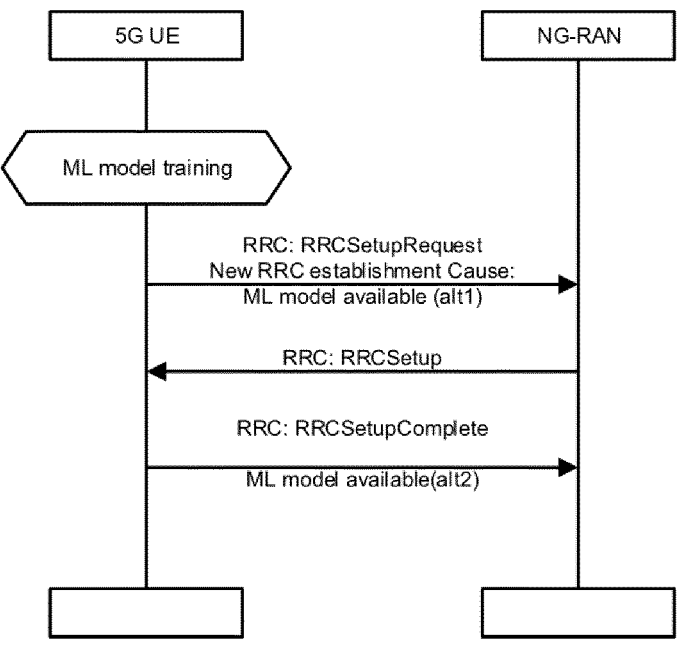
FIG. 2 shows a message flow according to some example embodiments of the invention.

If the ML model is trained in one of the states not having an RRC connection to the network (e.g. RRC_IDLE, RRC_INACTIVE), a starting point of the procedure, to indicate to the network the availability of the trained ML model, may be the initiation of RRC connection (i.e. RRC Setup procedure). FIG. 2 represents how the ML model retrieval initiation by the UE may be implemented.

Figure 3:
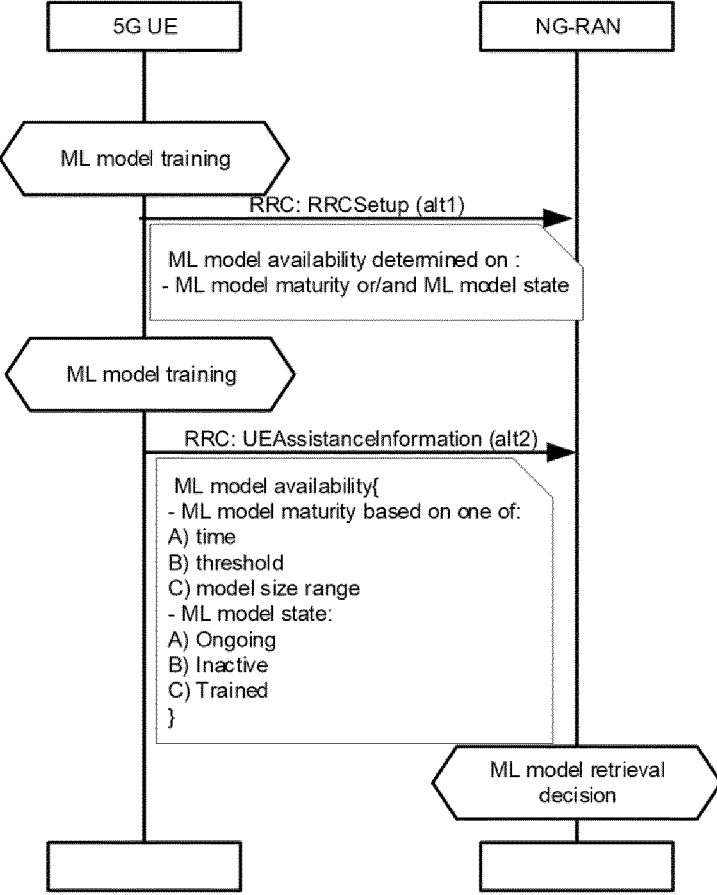
FIG. 3 shows a message flow according to some example embodiments of the invention.

For the ML model retrieval initiation by the UE, there are several options:

a. In one option, the ML model availability is realised by a new RRC establishment cause or a flag in two different cases in the RRC Setup Procedure. In this case, the availability is either explicitly indicated as a Boolean variable (true/false) or implicitly by the presence or absence of a respective parameter. In the first case, due to the size restriction on RRC Setup Request message, a new establishment cause (e.g. "ML model data") is understood as implicit method to indicate to the gNB that ML model is available for retrieval. In the second option, (alternative to RRCSetupRequest use) a flag (true/false) may be passed in RRC Setup Complete message. To avoid signalling overhead, UE may decide based on one or more of the parameters (e.g. maturity level, status) whether or not to indicate the availability of the trained model to the network. In some example embodiments, only one of these alternatives are implemented, while in some other example embodiments both of these alternatives are implemented. An example is shown in FIG. 2.

b. Option a is related to the initial RRC procedure (RRC Setup). Hence, it may not be used if the ML model availability is determined in RRC_CONNECTED state, or if the UE wants to inform the network on the ML model availability only after the RRC state transition to the RRC_CONNECTED state. At least in these cases, the UE may use the UEAssistanceInformation RRC procedure. This procedure is less restrictive in terms of size than RRC Setup and, thus, offers more flexibility in terms of signalling capabilities. A message flow is shown in FIG. 3. The larger flexibility allows the UE to indicate to the gNB the parameters on ML model training (e.g. maturity and/or status). UEAssistanceInformation RRC procedure may also be used as a complementary procedure to the indication of the ML model availability in RRC Setup procedure. In this case, UEAssistanceInformation RRC procedure may be used to pass the determined parameter value(s) of the training (e.g. maturity and/or status) to the network. UEAssistanceInformation RRC procedure offers the possibility to notify the network about availability of the trained ML model at any time when the UE is in RRC_CONNECTED state, independent from any state transitions.

Figure 4:
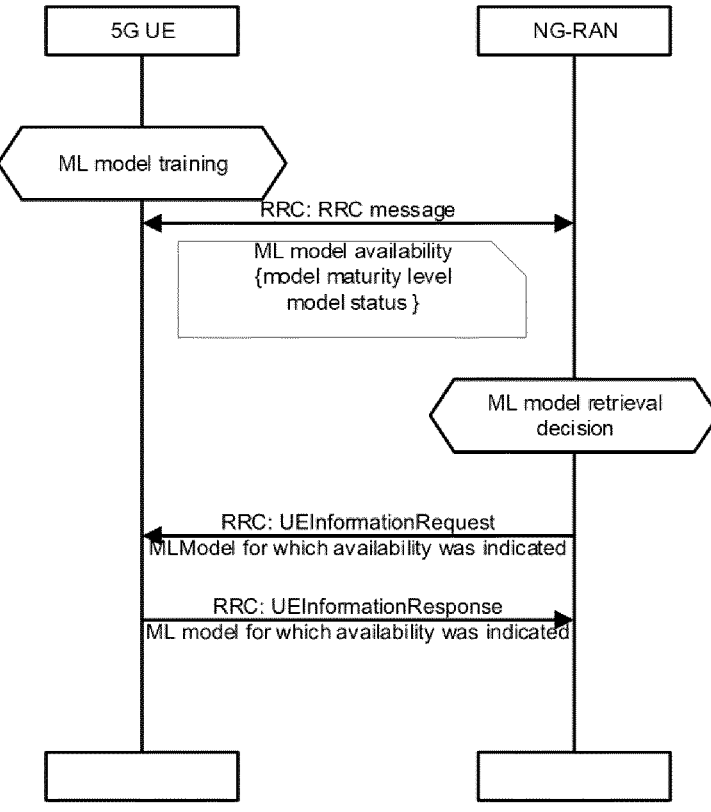
FIG. 4 shows a message flow according to some example embodiments of the invention.

2. The ML model retrieval by the gNB:

Upon receipt of the indication from the UE that a trained model is available, the gNB may use a RRC procedure to request the ML model. For example, as an RRC request message, gNB may use RRC UE Information Request message. UE responds accordingly (e.g. by RRC UE Information Response message) with the ML model, as depicted in FIG. 4.

The UE may have several ML models locally available. Those ML models may be used to train and further solve one or more optimization problems (ML model for coverage optimization, ML model for mobility robustness, etc). In that case, the request from the network can be per trained use case/ML model, or the gNB may obtain a plurality of models by a single request.

If the UE provides an actual parameter value (e.g. ML model maturity level, ML model status) of the training of the ML model to the gNB, the gNB may decide, based on the parameter value, to down-prioritize the signaling that will be used for ML model retrieval. For example, to support the lower priority, the gNB may decide to configure an SRB with lower priority than regular, more important dedicated signaling (SRB1, SRB2, SRB3). A new SRB (e.g. "SRB4") can be defined and used for the retrieval procedure of ML related contents, i.e., the existing RRC UE Information procedure may be used with the new (lower priority) assignment.

In some example embodiments, if the UE provides the ML model parameter value(s), a gNB may decide, based on the parameter value(s) on the time to retrieve the ML model. For example, it may decide to retrieve the ML model immediately, or to postpone the retrieval to a later point in time. Of course, a gNB may also decide, based on the parameter value, not to retrieve the ML model (=postpone to eternity).

In some example embodiments, a gNB may use the same parameter value for deciding on both down-prioritizing and postponement. For example, a gNB may use one or both of actual value of ML model maturity level and actual value of ML model status to decide on both down-prioritizing and postponement. In some example embodiments, gNB may use different parameters for these decisions. For example, it may use ML model maturity level to decide on down-prioritizing, and ML model status to decide on postponement (or vice versa).

Figure 5:
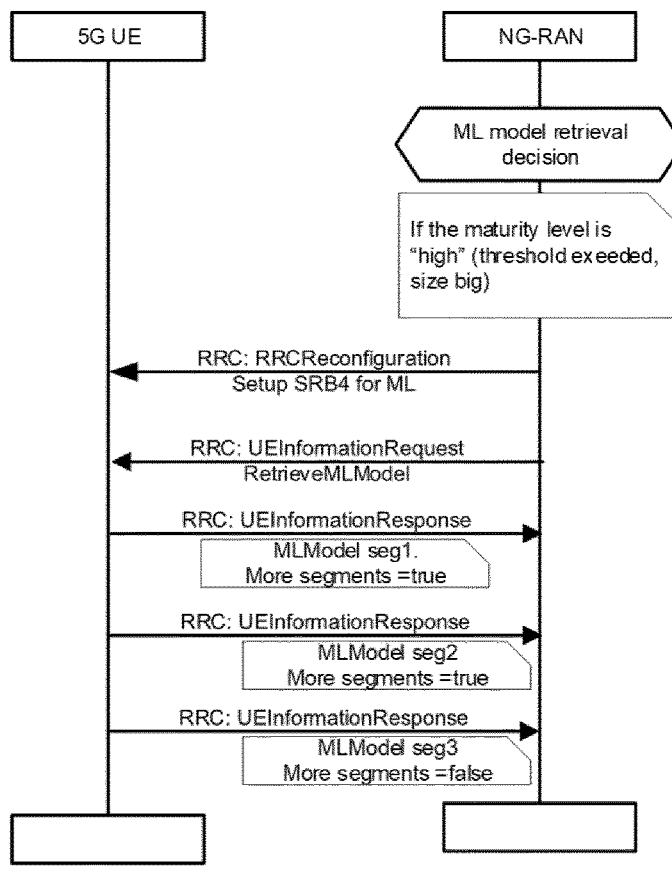
FIG. 5 shows a message flow according to some example embodiments of the invention.

The existing RRC UE Information procedure has the capability to provide the information split in segments of several UE Information messages. In this case, UE just indicates in a UE Information message that it has more segments of the ML model to send and consecutive UE Information Response message will come (see FIG. 5, the last three messages from UE to NG-RAN).

Figure 6:
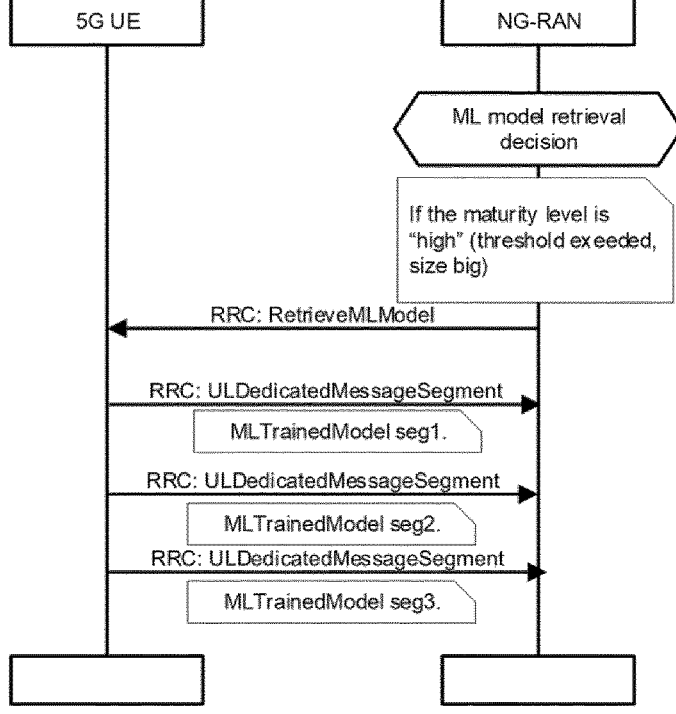
FIG. 6 shows a message flow according to some example embodiments of the invention.

In another example embodiment, the UE behavior, by its own, in response to ML retrieval command may segment the UL messages (e.g. in case the ML model data do not fit into one RRC message). To facilitate this, ULDedicatedMessageSegment RRC message is extended with new parameters for segmentation of the ML model (see FIG. 6), i.e., the applicability of the existing RRC message ULDedicatedMessageSegment is extended to ML use case. As shown in the example of FIG. 6, the network takes a retrieval decision based on the maturity level of the ML model which may be determined based on the ML model size, received at the network from the UE. In this way, the network can implicitly determine how many different segments will be needed to transfer the whole ML model based on the overall ML model size and the maximum size of the individual ULDedicatedMessageSegment RRC messages. As another alternative in the ULDedicatedMessageSegment RRC message the UE can indicate not only the segment number being sent each time, but also the total number of segments it has segmented the ML model into, e.g., Segment 1 out of 3, Segment 2 out of 3, Segment 3 out of 3. The two alternatives can be used separately, as two different options of indication to the network of the total number of segments, an implicit and an explicit. As another possibility, the two alternatives, the implicit and the explicit, can be used together, so that both the UE indicates the ML model size to the network, as well as the segment number being sent at each time together with the overall number of segments.

3. gNB distributes the ML model parameters onwards to other network entities (optional)

Depending on the use case, the ML model trained at the UE side and retrieved by the gNB with the procedures described above, may be executed in other network entities (network functions) than the gNB, for example in the Core Network. This scenario requires further distribution of the retrieved UE ML model across network interfaces between the gNB and the other network entities, as indicated in the FIG. 1.

Although the AI/ML algorithms are implementation-dependent, it is recommendable that the signalling support to retrieve the trained ML model from the UE as well as its forwarding to another network entities (network function) that executes the ML model (ML Inference Host) is standardized. The choice of training the model (or part of a model) in the UE is the best solution for many use cases requiring a big amount of UE measurements and/or information since it preserves the spectral efficiency without jeopardizing the regular radio resources use. At the same time, it enables to involve RAN into ML architecture and ML data retrieval to make use of the ML in the standardized 5G deployments.

FIG. 7 shows an apparatus according to an embodiment of the invention. The apparatus may be a terminal, such as a UE or MTC device, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for monitoring 20 and means for informing 30. The means for monitoring 20 and means for informing 30 may be a monitoring means and informing means, respectively. The means for monitoring 20 and means for informing 30 may be a monitor and an informer, respectively. The means for monitoring 20 and means for informing 30 may be a monitoring processor and informing processor, respectively.

The means for monitoring 20 monitors if a trained model (ML model) is available at a terminal (S20). If the trained model is available at the terminal (S20=yes), the means for informing informs a network that the trained model is available at the terminal (S30). The network may be the network to which the terminal is connected.

FIG. 9 shows an apparatus according to an embodiment of the invention. The apparatus may be a base station, such as a gNB or eNB, or an element thereof. FIG. 10 shows a method according to an embodiment of the invention. The apparatus according to FIG. 9 may perform the method of FIG. 10 but is not limited to this method. The method of FIG. may be performed by the apparatus of FIG. 9 but is not limited to being performed by this apparatus.

The apparatus comprises means for monitoring 120 and means for requesting 130. The means for monitoring 120 and means for requesting 130 may be a monitoring means and requesting means, respectively. The means for monitoring 120 and means for requesting 130 may be a monitor and a requester, respectively. The means for monitoring 120 and means for requesting 130 may be a monitoring processor and requesting processor, respectively.

The means for monitoring 120 monitors if an information is received that a trained model (ML model) is available at a terminal (S120). If the information is received (S120=yes), the means for requesting 130 requests the terminal to provide the trained model (S130).

FIG. 11 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 8 and 10 and related description.

Some example embodiments are explained with respect to a 5G network. However, the invention is not limited to 5G. It may be used in 3G or 4G networks and 3GPP networks of future generations if they support that the terminal (UE) trains an ML model. Furthermore, the invention is not limited to 3GPP networks. It may be used by other networks (e.g. WiFi networks) if the respective terminal trains an ML model and the result of the training is to be passed to the network.

In some environments, the parameter(s) related to the training of the ML model may be denoted "attributes". The terms "parameter" and "attribute" may be considered synonymous in the present context.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

A terminal (UE) may be e.g. a mobile phone, a smartphone, a MTC device, a laptop etc. The user may be a human user or a machine (e.g. in machine-type communication (MTC)).

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a terminal such as a UE or an MTC device, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, an access network such as a RAN, or a component thereof (e.g. eNB or gNB), an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising:

one or more processors, and memory storing instructions that, when executed by the one or more processors, cause the apparatus to:

monitor if an information is received that a trained model is available at a terminal;

request the terminal to provide the trained model if the information is received from the terminal;

check whether the information received from the terminal comprises an actual value of a first parameter regarding the training of the trained model is received;

decide on a time when to request the terminal to provide the one or more parameters of the trained model based on the actual value of the first parameter;

inhibit the requesting the terminal to provide the trained model earlier than at the decided time;

check whether the information received from the terminal comprises an actual value of a second parameter regarding the training of the trained model;

decide a priority for retrieving the trained model from the terminal based on the actual value of the second parameter; and configure a radio bearer for the terminal to provide the trained model according to the priority.

2. The apparatus according to claim 1, wherein the first parameter and the second parameter, respectively, comprises at least one of a maturity level of the trained model and a status of the trained model.

3. The apparatus according to claim 1, wherein the instructions, when executed by the one or more processors, further cause the apparatus to:

provide a target value of the first parameter and a target value of the second parameter, respectively, to the terminal via a radio resource control command.

4. The apparatus according to claim 3, wherein the target value of the first parameter and the target value of the second parameter, respectively, is received from an operation and maintenance center.

* * * * *